(12) United States Patent
Sivertsen

(10) Patent No.: US 7,793,019 B1
(45) Date of Patent: Sep. 7, 2010

(54) REDIRECTING INPUT AND OUTPUT FOR MULTIPLE COMPUTERS

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 12/395,022

(22) Filed: Feb. 27, 2009

Related U.S. Application Data

(62) Division of application No. 10/926,241, filed on Aug. 25, 2004, now Pat. No. 7,519,749.

(51) Int. Cl.
G06F 3/00 (2006.01)
G06F 13/12 (2006.01)
G06F 15/16 (2006.01)

(52) U.S. Cl. .............................. 710/72; 710/36; 710/73; 709/250

(58) Field of Classification Search .................. None
See application file for complete search history.

(56) References Cited

U.S. PATENT DOCUMENTS

| | | | |
|---|---|---|---|
| 4,589,068 A | 5/1986 | Heinen, Jr. | |
| 4,979,074 A | 12/1990 | Morley et al. | |
| 5,228,039 A | 7/1993 | Knoke et al. | |
| 5,388,252 A | 2/1995 | Dreste et al. | |
| 5,455,933 A | 10/1995 | Schieve et al. | |
| 5,491,743 A | 2/1996 | Shiio et al. | |
| 5,615,331 A | 3/1997 | Toorians et al. | |
| 5,625,410 A | 4/1997 | Washino et al. | |
| 5,630,049 A | 5/1997 | Cardoza et al. | |
| 5,732,212 A | 3/1998 | Perholtz et al. | |
| 5,777,874 A | 7/1998 | Flood et al. | |
| 5,815,653 A | 9/1998 | You et al. | |
| 5,819,093 A | 10/1998 | Davidson et al. | |
| 5,850,562 A | 12/1998 | Crump et al. | |
| 5,878,158 A | 3/1999 | Ferris et al. | |
| 5,953,451 A | 9/1999 | Syeda-Mahmood | |
| 5,990,852 A | 11/1999 | Szamrej | |
| 6,011,920 A | 1/2000 | Edwards et al. | |
| 6,035,059 A | 3/2000 | Kurosawa et al. | |
| 6,054,676 A | 4/2000 | Wall et al. | |
| 6,055,334 A | 4/2000 | Kato | |
| 6,065,072 A | 5/2000 | Flath | |

(Continued)

OTHER PUBLICATIONS

QuickSpecs, Compaq PCI Card KVM Switches, Mar. 13, 2003, Version 5.*

(Continued)

*Primary Examiner*—Alan Chen
(74) *Attorney, Agent, or Firm*—Hope Baldauff Hartman LLC

(57) ABSTRACT

Apparatus, methods, and systems provide for remote management of a set of local computers by transferring screen frames produced by the local computer for viewing at a remote computer. A redirection module captures and transmits video signals from a local computer through over a network, such as the Internet, to a remote computer where the remote computer produces a display that contains the screen frames being transferred. The module is configured for use with and installation within a keyboard, video, and mouse switch configured for receiving the module. The redirection module is further configured for use with and installation on a server-blade to allow remote management of the server-blade.

18 Claims, 10 Drawing Sheets

U.S. PATENT DOCUMENTS

| | | | |
|---|---|---|---|
| 6,115,645 | A | 9/2000 | Berar |
| 6,119,247 | A | 9/2000 | House et al. |
| 6,124,811 | A | 9/2000 | Acharya et al. |
| 6,137,455 | A | 10/2000 | Duo |
| 6,145,088 | A | 11/2000 | Stevens |
| 6,170,021 | B1 | 1/2001 | Graf |
| 6,202,070 | B1 | 3/2001 | Nguyen et al. |
| 6,209,023 | B1 | 3/2001 | Dimitroff et al. |
| 6,219,695 | B1 | 4/2001 | Guttag et al. |
| 6,236,884 | B1 | 5/2001 | Hunter et al. |
| 6,243,743 | B1 | 6/2001 | Freeny |
| 6,249,885 | B1 | 6/2001 | Johnson et al. |
| 6,263,373 | B1 | 7/2001 | Cromer et al. |
| 6,272,562 | B1 | 8/2001 | Scott et al. |
| 6,288,753 | B1 | 9/2001 | DeNicola et al. |
| 6,304,895 | B1 | 10/2001 | Schneider et al. |
| 6,330,167 | B1 | 12/2001 | Kobayashi |
| 6,360,250 | B1 | 3/2002 | Anupam et al. |
| 6,377,461 | B1 | 4/2002 | Ozmat et al. |
| 6,378,014 | B1 | 4/2002 | Shirley |
| 6,397,256 | B1 | 5/2002 | Chan et al. |
| 6,414,716 | B1 | 7/2002 | Kawai |
| 7,165,041 | B1 | 7/2002 | Golender et al. |
| 6,434,003 | B1 | 8/2002 | Roy et al. |
| 6,476,854 | B1 | 11/2002 | Emerson et al. |
| 6,552,914 | B1 | 4/2003 | Chang |
| 6,560,641 | B1 | 5/2003 | Powderly et al. |
| 6,601,119 | B1 | 7/2003 | Slutz et al. |
| 6,603,665 | B1 | 8/2003 | Truong et al. |
| 6,609,034 | B1 | 8/2003 | Ehrens et al. |
| 6,636,929 | B1 | 10/2003 | Frantz et al. |
| 6,636,982 | B1 | 10/2003 | Rowlands |
| 6,651,120 | B2 | 11/2003 | Chiba et al. |
| 6,651,190 | B1 | 11/2003 | Worley et al. |
| 6,662,217 | B1 | 12/2003 | Godfrey et al. |
| 6,664,969 | B1 | 12/2003 | Emerson et al. |
| 6,681,250 | B1 | 1/2004 | Thomas et al. |
| 6,754,891 | B1 | 6/2004 | Snyder et al. |
| 6,779,004 | B1 | 8/2004 | Zintel |
| 6,816,963 | B1 | 11/2004 | Krithivas et al. |
| 6,820,267 | B2 | 11/2004 | Christensen et al. |
| 6,825,846 | B2 | 11/2004 | Mondal |
| 6,894,906 | B2 | 5/2005 | Sivertsen |
| 6,907,519 | B2 | 6/2005 | Desoli |
| 6,959,380 | B2 | 10/2005 | Dake et al. |
| 6,963,425 | B1 | 11/2005 | Nair et al. |
| 6,993,747 | B1 | 1/2006 | Friedman |
| 7,003,563 | B2 * | 2/2006 | Leigh et al. ............. 709/223 |
| 7,039,229 | B2 | 5/2006 | Lin et al. |
| 7,085,814 | B1 | 8/2006 | Gandhi et al. |
| 7,181,510 | B2 | 2/2007 | Emerson et al. |
| 7,209,874 | B2 | 4/2007 | Salmonsen |
| 7,231,606 | B2 | 6/2007 | Miller et al. |
| 7,233,336 | B2 | 6/2007 | Mondal |
| 7,260,624 | B2 | 8/2007 | Sivertsen et al. |
| 7,299,463 | B2 | 11/2007 | Brannock et al. |
| 7,349,956 | B2 | 3/2008 | Anderson et al. |
| 7,555,421 | B1 | 6/2009 | Beckett et al. |
| 2001/0027465 | A1 | 10/2001 | Hammelbacher |
| 2001/0037366 | A1 | 11/2001 | Web et al. |
| 2002/0040418 | A1 | 4/2002 | Bress et al. |
| 2002/0078188 | A1 | 6/2002 | Anand et al. |
| 2002/0083156 | A1 | 6/2002 | Wyscoczynski |
| 2002/0087949 | A1 | 7/2002 | Golender et al. |
| 2002/0097234 | A1 | 7/2002 | Sauber |
| 2002/0103882 | A1 | 8/2002 | Johnston et al. |
| 2002/0124128 | A1 | 9/2002 | Qiu |
| 2002/0174415 | A1 | 11/2002 | Hines |
| 2002/0178320 | A1 | 11/2002 | Wu |
| 2002/0194403 | A1 | 12/2002 | Pua et al. |
| 2002/0199035 | A1 | 12/2002 | Christensen et al. |
| 2003/0023435 | A1 | 1/2003 | Josephson |
| 2003/0035049 | A1 | 2/2003 | Dickens et al. |
| 2003/0058248 | A1 | 3/2003 | Hockmuth et al. |
| 2003/0083842 | A1 | 5/2003 | Miller et al. |
| 2003/0110244 | A1 | 6/2003 | Mondal |
| 2003/0156132 | A1 | 8/2003 | Gn et al. |
| 2003/0177111 | A1 | 9/2003 | Egendorf et al. |
| 2003/0200273 | A1 | 10/2003 | Khanna et al. |
| 2003/0226015 | A1 | 12/2003 | Neufeld et al. |
| 2004/0054838 | A1 | 3/2004 | Hoese et al. |
| 2004/0059782 | A1 | 3/2004 | Sivertsen |
| 2004/0158614 | A1 | 8/2004 | Williams |
| 2004/0190773 | A1 | 9/2004 | Messer et al. |
| 2004/0199699 | A1 | 10/2004 | Bobbitt et al. |
| 2004/0215617 | A1 | 10/2004 | Ramsey et al. |
| 2004/0222944 | A1 | 11/2004 | Sivertsen |
| 2004/0230668 | A1 | 11/2004 | Carnahan et al. |
| 2004/0243883 | A1 | 12/2004 | Shankar et al. |
| 2004/0255276 | A1 | 12/2004 | Rovang |
| 2005/0021654 | A1 | 1/2005 | Kern et al. |
| 2005/0044244 | A1 | 2/2005 | Warwick et al. |
| 2005/0066000 | A1 | 3/2005 | Liaw et al. |
| 2005/0086670 | A1 | 4/2005 | Christensen et al. |
| 2006/0189900 | A1 | 8/2006 | Flaherty |
| 2006/0195042 | A1 | 8/2006 | Flaherty |
| 2007/0168746 | A1 | 7/2007 | Righi et al. |

OTHER PUBLICATIONS

"Cable Allows Users to Extend DVI Connections," Jul. 31, 2001, *The Mac Observer*, printed from http://www.macobserver.com/article/2001/07/31.11.shtml, 4 pages.

"New KVM Switching System Controls 2,048 Servers Using Cat5 Cable" printout from Raritan website found at http://www.raritan.com//about/abt_press_detail.aspx?&status=4&articleld=127, printed May 23, 2006, 2 pages.

"Z-Series Information Page" printout from Raritan website found at www.Raritan.com/products/kvm_switches/z_series/prd_line.aspx. Printed Feb. 10, 2006, 1 page.

American Megatrends, Inc., AMIBIOS8, Introduction to AMIBIOS8™: Overview of Key Features in the Latest AMIBIOS®, Version 1.20, Mar. 25, 2002, 22 pages.

American Megatrends, Inc., AMI Debug Source Level Modular Software Debugger, Data Sheet, Dec. 14, 2004, 2 pages.

American Megatrends, Inc. AMIDebug User's Guide (Version 2.0), 2002, 101 pages.

American Megatrends, Inc. AMIDiag for Windows User's Guide (Version 2.0), Feb. 25, 2002. http://ami.com/support/docc/MAN-DIAG-WIN.pdf, 108 pages.

AVIT Research, Ltyd., I²C Bus Tool, printed from www.avitresearch.co.uk/ on Aug. 29, 2005, 4 pages.

Calibre, "UCA93LV: USB—I²C Communications Adapter for PCs" Jan. 28, 2005, 2 pages.

Raritan Computer, Inc., "Raritan Announces New Paragon CIMs with Innovative DirectConnect Technology," a press release, Jan. 14, 2002, printed from www.raritan.com on Jan. 27, 2005, 2 pages.

Saelig Online Store, UCA93LV, printed from www.saelig.com on Aug. 29, 2005, 2 pages.

U.S. Official Action dated Aug. 13, 2003 in U.S. Appl. No. 10/016,484.

U.S. Official Action dated Mar. 8, 2004 in U.S. Appl. No. 10/016,484.

U.S. Official Action dated Jun. 22, 2004 in U.S. Appl. No. 10/016,484.

U.S. Notice of Allowance and Allowability dated Jul. 15, 2004 in U.S. Appl. No. 10/016,484.

U.S. Official Action dated Feb. 23, 2004 in U.S. Appl. No. 10/247,876.

U.S. Official Action dated Aug. 3, 2004 in U.S. Appl. No. 10/247,876.

U.S. Official Action dated Feb. 3, 2005 in U.S. Appl. No. 10/247,876.

U.S. Official Action dated Aug. 8, 2005 in U.S. Appl. No. 10/247,876.

U.S. Official Action dated Feb. 24, 2006 in U.S. Appl. No. 10/247,876.

U.S. Official Action dated Aug. 17, 2006 in U.S. Appl. No. 10/247,876.
U.S. Notice of Allowance and Allowability dated Apr. 11, 2007 in U.S. Appl. No. 10/247,876.
U.S. Official Action dated Sep. 19, 2006 in U.S. Appl. No. 10/403,198.
U.S. Official Action dated Mar. 6, 2007 in U.S. Appl. No. 10/403,198.
U.S. Notice of Allowance and Allowability dated May 31, 2007 in U.S. Appl. No. 10/403,198.
U.S. Notice of Allowance and Allowability dated Sep. 18, 2007 in U.S. Appl. No. 10/403,198.
U.S. Notice of Allowance and Allowability dated Jan. 11, 2008 in U.S. Appl. No. 10/403,198.
U.S. Notice of Allowance and Allowability dated May 13, 2008 in U.S. Appl. No. 10/403,198.
U.S. Official Action dated Jan. 24, 2006 in U.S. Appl. No. 10/446,044.
U.S. Official Action dated Jul. 14, 2006 in U.S. Appl. No. 10/446,044.
U.S. Official Action dated Oct. 5, 2006 in U.S. Appl. No. 10/446,044.
U.S. Official Action dated Apr. 5, 2007 in U.S. Appl. No. 10/446,044.
U.S. Official Action dated Sep. 18, 2007 in U.S. Appl. No. 10/446,044.
U.S. Official Action dated Jan. 8, 2008 in U.S. Appl. No. 10/446,044.
U.S. Notice of Allowance and Allowability dated Jun. 9, 2008 in U.S. Appl. No. 10/446,044.
U.S. Official Action dated Sep. 11, 2006 in U.S. Appl. No. 10/462,509.
U.S. Official Action dated Mar. 6, 2007 in U.S. Appl. No. 10/462,509.
U.S. Official Action dated Jun. 29, 2007 in U.S. Appl. No. 10/462,509.
U.S. Notice of Allowance and Allowability dated Nov. 1, 2007 in U.S. Appl. No. 10/462,509.
U.S. Official Action dated Nov. 29, 2007 in U.S. Appl. No. 10/462,509.
U.S. Official Action dated Jul. 9, 2008 in U.S. Appl. No. 10/462,509.
U.S. Notice of Allowance / Allowability dated Jan. 26, 2009 in U.S. Appl. No. 10/462,509.
U.S. Appl. No. 10/790,160, filed Mar. 1, 2004, entitled "Method, System and Apparatus for Communicating with a Computer Management Device," Inventor: Subash Kalbarga.
U.S. Official Action dated Dec. 17, 2007 in U.S. Appl. No. 10/790,160.
U.S. Official Action dated Jun. 25, 2009 in U.S. Appl. No. 10/790,160.
U.S. Official Action dated Jan. 7, 2009 in U.S. Appl. No. 10/790,160.
U.S. Notice of Allowance and Allowability dated Nov. 10, 2004 in U.S. Appl. No. 10/867,348.
U.S. Official Action dated Feb. 27, 2007 in U.S. Appl. No. 10/867,406.
U.S. Official Action dated Aug. 10, 2007 in U.S. Appl. No. 10/867,406.
U.S. Official Action dated Dec. 27, 2007 in U.S. Appl. No. 10/867,406.
U.S. Notice of Allowance / Allowability dated Jul. 23, 2008 in U.S. Appl. No. 10/867,406.
U.S. Appl. No. 10/875,641 filed Jun. 24, 2004, Entitled "Method and System For Remote Software Debugging", Inventors: Stefano Righi and Eric Mills.
U.S. Official Action dated Jul. 27, 2007 in U.S. Appl. No. 10/875,641.
U.S. Official Action dated Jan. 10, 2008 in U.S. Appl. No. 10/875,641.
U.S. Official Action dated Jun. 3, 2008 in U.S. Appl. No. 10/875,641.
U.S. Notice of Allowance / Allowability dated Jan. 8, 2009 in U.S. Appl. No. 10/875,641.
U.S. Official Action dated Sep. 8, 2008 in U.S. Appl. No. 10/926,241.
U.S. Notice of Allowance / Allowability dated Dec. 2, 2008 in U.S. Appl. No. 10/926,241.
U.S. Official Action dated Apr. 18, 2006 in U.S. Appl. No. 10/966,221.
U.S. Official Action dated Sep. 5, 2006 in U.S. Appl. No. 10/966,221.
U.S. Notice of Allowance and Allowability dated Jan. 5, 2007 in U.S. Appl. No. 10/966,221.
U.S. Official Action dated May 14, 2008 in U.S. Appl. No. 11/300,045.
U.S. Official Action dated Dec. 2, 2008 in U.S. Appl. No. 11/300,045.
U.S. Appl. No. 12/395,015 filed Feb. 27, 2009, entitled "Redirecting Input and Output for Multiple Computers", Inventor: Clas Gerhard Sivertsen.
U.S. Appl. No. 12/395,028 filed Feb. 27, 2009, entitled "Redirecting Input and Output for Multiple Computers", Inventor: Clas Gerhard Sivertsen.
U.S. Appl. No. 12/425,455 filed Apr. 17, 2009, entitled "Method and System for Remote Software Debugging", Inventors: Righi et al.
U.S. Appl. No. 12/470,854 filed May 22, 2009, entitled "Method and System for Remote Software Testing", Inventor: Gene Rovang.
U.S. Official Action dated Jul. 1, 2009 in U.S. Appl. No. 10/790,160.
U.S. Official Action dated May 27, 2009 in U.S. Appl. No. 11/300,045.
U.S. Official Action dated Dec. 23, 2009 in U.S. Appl. No. 10/790,160.
U.S. Official Action dated Dec. 8, 2009 in U.S. Appl. No. 11/300,045.
U.S. Official Action dated Dec. 30, 2009 in U.S. Appl. No. 12/395,015.
U.S. Office Action dated Apr. 23, 2010 in U.S. Appl. No. 12/395,028.

* cited by examiner

REDIRECTING INPUT AND OUTPUT FOR MULTIPLE COMPUTERS

CROSS-REFERENCE TO RELATED APPLICATIONS

This application is a division of U.S. patent application Ser. No. 10/926,241 filed Aug. 25, 2004 now U.S. Pat. No. 7,519,749, which is expressly incorporated herein by reference.

This Application is related to U.S. patent application Ser. No. 12/395,015, filed Feb. 27, 2009, entitled "Redirecting Input and Output for Multiple Computers"; and U.S. patent application Ser. No. 12/395,028, filed Feb. 27, 2009, entitled "Redirecting Input and Output for Multiple Computers."

This application is also related to U.S. Pat. No. 6,825,846, entitled "System and Methods for Capturing Screen Displays from a Host Computing System for Display at a Remote Terminal," filed Dec. 10, 2001; U.S. Pat. No. 7,260,624, entitled "Systems and Methods for Establishing Interaction Between a Local Computer and a Remote Computer," filed Sep. 20, 2002; U.S. Pat. No. 6,894,906, entitled "Housing For In-Line Video, Keyboard and Mouse Remote Management Unit," filed Jun. 14, 2004; and U.S. Pat. No. 7,454,490, entitled "In-Line Video, Keyboard and Mouse Remote Management Unit," filed Jun. 14, 2004, which are each incorporated by reference herein.

BACKGROUND OF THE INVENTION

Computers are often linked together through networks to allow the resources of a computer at one location to be used by a computer and end user at another location. It is often necessary to manage activities of a computer or determine the relative health of a computer system by viewing screen display information and/or interacting with the computer through user input devices. This is especially true for servers whose resources are utilized by many individual client computers, such as within a corporate network or the Internet. For many conventional systems, the technician or other user who needs to view the screen displays and interact with the computer being managed is required to be physically located at the site of the computer. However, it is not always feasible for a technician or other user to be physically present.

For example, a system administrator of a corporate network is present at one location, but the computers of the corporate network may be spread around the globe. To effectively manage the computers of the corporate network, the system administrator must be able to effectively monitor many or all of the computers of the network contemporaneously. Because the system administrator cannot be physically present at each computer to be managed at the same time, effective management of the computers of the network becomes very difficult if not impossible. As a result, costly additional human resources are required to improve management of the computers.

Present solutions to providing remote management are a service under the operating system or a software application such as PC ANYWHERE from SYMANTEC CORPORATION. However, because these present solutions are software based, the operating system must be operational with all services loaded to allow the remote monitoring to occur. Therefore, configuration and boot-up screens such as those provided by a BIOS are not made available to the remote location. For this reason, utilization of a hardware-based device is desirable.

Hardware based devices for providing remote management are also available. U.S. Pat. No. 6,825,846, entitled "System and Methods for Capturing Screen Displays from a Host Computing System for Display at a Remote Terminal" and assigned to AMERICAN MEGATRENDS, INC., describes hardware used to send and receive keyboard, video, and mouse input data to and from a remote computer. Similarly, U.S. Pat. No. 7,260,624, entitled "Systems and Methods for Establishing Interaction Between a Local Computer and a Remote Computer" and assigned to AMERICAN MEGATRENDS, INC., describes an external device, which when connected to a local computer and to a network, may be used to send and receive keyboard, video, and mouse input data to and from a remote computer. In order to remotely manage a computer using these hardware based devices, each computer to be remotely managed is connected to a remote computer through a network using either an internal card, or an external remote management device. This can become cumbersome when there are many local computers for which it is desirable to remotely monitor and manage.

An alternative is to connect each of the local computers to a keyboard, video, and mouse ("KVM") device. The KVM device must then be connected to a remote computer via an external remote management device connected to the network. While effective, doing so increases the number of cables and connectors from the local computer to the remote computer, increasing the possibility for signal degradation as well as increasing the general clutter around the KVM since the cables and external remote management device occupies space. It is with respect to these considerations and others that the present invention has been made.

SUMMARY OF THE INVENTION

Aspects of the present invention address these problems and others by providing a KVM redirection module for establishing interaction between one of a plurality of local computers and a remote computer. The redirection module includes a printed circuit board that has an interface connector, a frame grabber, a network interface device with a network connector, and a processing device. The interface connector is disposed at a one edge of the printed circuit board and is configured to interface with a mating connector on a KVM switch. The redirection module is configured to receive video signals from a selected local computer of the plurality of local computers through the KVM switch mating connector. The frame grabber on the printed circuit board grabs screen frames from the video signals to create screen frame data. The processing device is configured to provide the screen frame data to the network interface device for distribution across a network.

Another aspect of the invention is a KVM switch for allowing control of a plurality of local computers from a remote computer. The switch includes a printed circuit board having at least one internal connector for connection to a KVM redirection module, and a housing that encloses the printed circuit board and internal connector. Each internal connector is configured to provide video signal data from a local computer to a connected KVM redirection module. The housing of the switch contains at least one opening opposite the internal connectors for receiving a KVM redirection module. Additionally, the switch contains a plurality of keyboard, video, and mouse input connectors corresponding to the plurality of local computers. These input connectors are electrically connected to the printed circuit board and are accessible externally from the housing.

Yet another aspect is a system for allowing control of a plurality of local computers from a remote computer. The system includes a first printed circuit board having an internal connector, a KVM redirection module comprising a second printed circuit board having an interface connector connected to the internal connector of the first printed circuit board, and a housing encompassing the two printed circuit boards. The second printed circuit board also has a frame grabber, a network interface device with a network connector, and a processing device. The second printed circuit board is configured to receive video signals from a local computer through the internal connector of the first printed circuit board. The frame grabber on the second printed circuit board grabs screen frames from the video signals to create screen frame data. The processing device is configured to provide the screen frame data to the network interface device for distribution across a network.

The housing contains at least one opening opposite each internal connector for receiving a KVM redirection module. Additionally, the system contains a plurality of keyboard, video, and mouse input connectors corresponding to the plurality of local computers. These input connectors are electrically connected to the first printed circuit board and are accessible externally from the housing. Video and input signals from the plurality of local computers flows into these input connectors, through the first printed circuit board, through the second printed circuit board where they are processed, and out the network connector to the remote computer via the network.

Another aspect of the invention is a KVM redirection module for establishing interaction between a plurality of local computers and a remote computer. The redirection module includes a printed circuit board that has an interface connector, a frame grabber, a network interface device with a network connector, and a processing device. The interface connector is disposed at a one edge of the printed circuit board and is configured to interface with a mating connector on a server-blade. The redirection module is configured to receive video signals from a local computer of the plurality of local computers through the server-blade mating connector. The frame grabber on the printed circuit board grabs screen frames from the video signals to create screen frame data. The processing device is configured to provide the screen frame data to the network interface device for distribution across a network.

A further aspect of the present invention is a method of controlling a plurality of local computers from a remote computer. A plurality of local computers are connected to a corresponding plurality of input connectors on a KVM switch. A KVM redirection module is installed in the KVM switch by inserting the module through an opening in a housing surface of the KVM switch. An interface connector disposed on a first edge of the redirection module connects to an internal connector disposed on a surface of a printed circuit board within the KVM switch. A surface of the redirection module that opposes the internal connector is secured to the housing surface of the KVM switch, holding the module in place.

A network cable is connected to a network and to a network connector of the redirection module. The network connector is externally accessible through an opening in a housing that encompasses the printed circuit board with the internal connector and the installed redirection module. A local computer is selected from the plurality of local computers. Video signals from the selected local computer are transmitted over the network by the KVM redirection module and received at the remote computer. Keyboard or mouse inputs are provided to the local computer from the remote computer via the KVM redirection module and KVM switch combination over the network.

These and various other features as well as advantages, which characterize the present invention, will be apparent from a reading of the following detailed description and a review of the associated drawings.

DETAILED DESCRIPTION OF THE PREFERRED EMBODIMENT

Local computers may be managed remotely through embodiments of the present invention so that the system manager or other user need not be physically present with the local computer but instead views screen displays and interacts with the local computer through a remotely located computer. For example, the user can remotely view screen frames being produced by the local computer to determine whether the local computer has crashed or whether the local computer is executing a particular application. Additionally, the end user may operate a user input device of the remote computer such as a mouse or keyboard, and the user input is transferred to the local computer where it can be implemented.

Figure 1:
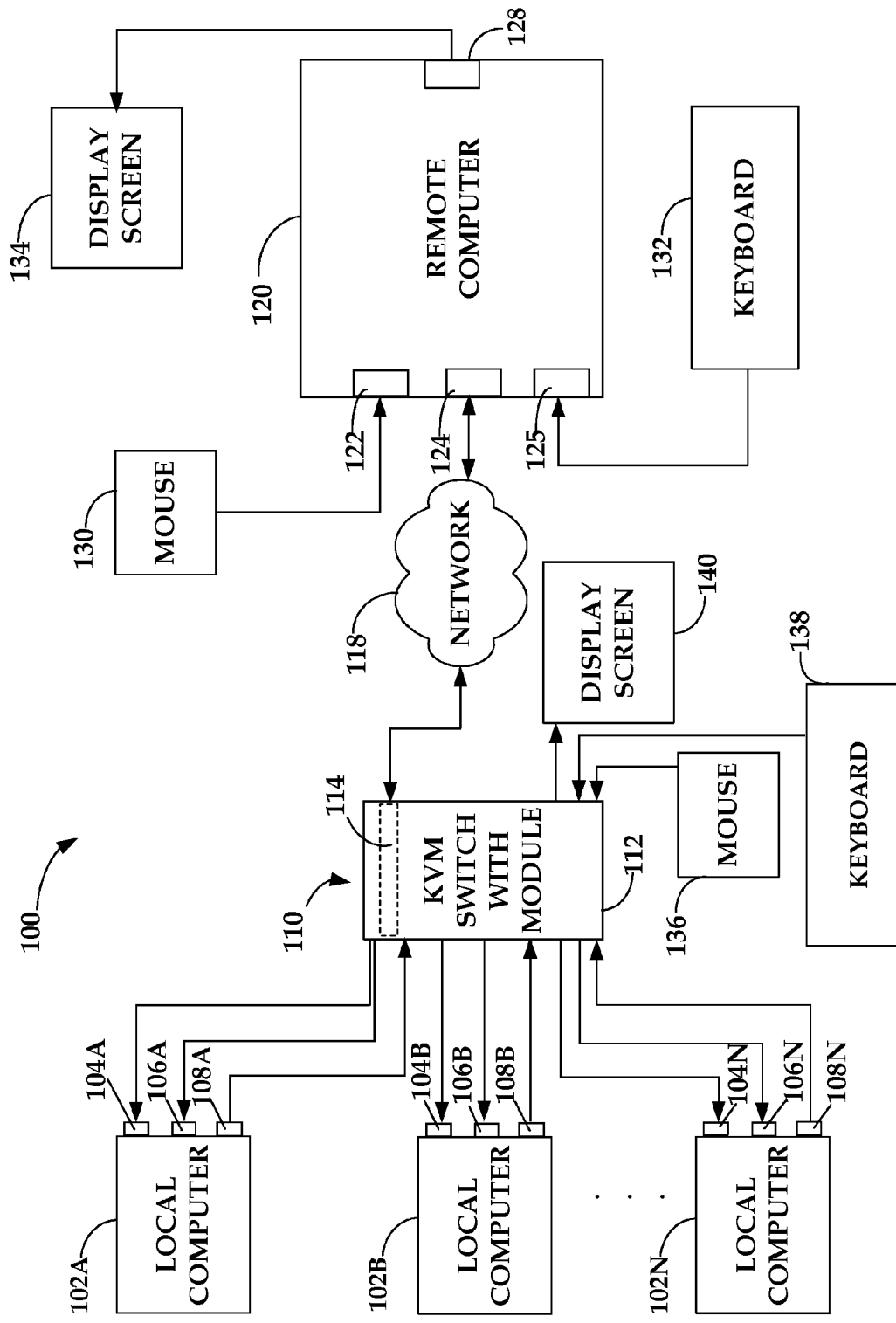
FIG. 1 illustrates a network operating environment for embodiments of the present invention that allow a remote computer to display screen frames of each local computer of a set of local computers and provide user interaction with the screen frames.

An environment for application of embodiments of the present invention is shown in FIG. 1. The environment generally includes a set of local computers 102A-102N that are to be remotely managed. Each local computer 102 is connected through its video output 108 to an interaction system 110. According to one embodiment, interaction system 110 includes a KVM switch 112 ("switch") with a KVM redirection module 114 ("module"). System 110, switch 112, and module 114 are described in detail below. Interaction system 110 is disposed between a network 118 and the set of local computers 102A-102N. A remote computer 120 is linked to' the network 118, and the local computer 102 mayor may not be linked to the same network 118 or another network not shown. The network 118 may be of various forms such as a local area network ("LAN") or wide area network ("WAN") including the Internet. A user is located at the remote computer 120 and remotely manages the local computer 102 via the network 118 and interaction system 110.

The interaction system 110 may be linked to the set of local computers 102A-102N through several input/output ("I/O") connections of each local computer 102. Generally, a local computer 102 will have a video display output 108, such as an analog or digital VGA output. Also, the local computer 102 typically includes a PS/2 port or ordinary serial port configured as a mouse port 104, a keyboard port 106, and may also or alternatively include a universal serial bus ("USB") port (not shown). User input devices may also be provided for each local computer 102, including a local mouse and local keyboard. Conventionally, the local mouse 136 and keyboard 138 would be directly connected to the mouse port 104 and keyboard port 106 of the local computer 102. However, in the embodiment shown in FIG. 1, the local mouse 136 and local keyboard 138 are connected to a mouse port and keyboard port, respectively, of the interaction system 110 and provide mouse and keyboard data to the interaction system 110 through these connections. The interaction system 110 then passes the mouse data and keyboard data to the respective ports of the local computer 102.

The video display output 108 provides a signal that ordinarily is passed directly to a local display screen 140 or monitor where screen frames are displayed for a user present at the local computer 102. However, in the embodiment shown, the interaction system 110 provides for the pass-through of the video signal to a local display 140 connected directly to the interaction system 110. In one embodiment, the video display output 108 provides a video signal to a video input of the interaction system 110. Alternatively, the interaction system 110 provides for the pass-through of the video signal back to the local computer 102 for output to a local display 140 connected to video output 108.

In addition to providing the pass-through of the video signal to a local display screen 140, the interaction system 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the interaction device 110 and the remote computer 120, such as the TCP/IP protocol ordinarily used via the Internet.

The remote computer 120 implements an application, such as a dedicated application or general purpose browser window such as a web browser, for receiving the screen frame data through the network interface 124 and providing a display on the display screen 134. The display includes the screen frame produced by the local computer 102 that corresponds to the screen frame data transferred by the interaction system 110. Typically, the remote computer 120 includes a video adapter that has a video output 128 connected to the display screen 134 to provide the video signals.

To allow the user of the remote computer 120 to fully interact with the local computer 102, user interface devices such as a mouse 130 and keyboard 132 are connected to a mouse port 122 and keyboard port 125, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the interaction device, then the processing device of the remote computer 120 transfers the user activity data over the network 118 to the interaction device 110 that passes it to the mouse port 104 and/or keyboard port 106.

Once the local computer 102 receives the user activity data through the mouse port 104 and/or keyboard port 106, the local computer 102 then implements the user activity as if it had occurred through a local mouse or local keyboard. When implemented, the user activity alters the screen frame to be displayed. Therefore, the video signal output by the video connector 108 to the interaction system 110 provides the screen frames that show the change caused by the user activity at the remote computer 120, such as the mouse pointer moving or letters appearing in an electronic document.

The interaction system 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the local computer 102 and transferring the updated screen frame back to the remote computer 120.

As processing and propagation delays decrease within the environment 100, the initial and subsequent display of the same user activity (i.e., multiple cursors or mouse pointers) on the display screen 134 converge in time so that the user sees only one change. For example, moving a mouse pointer within the local computer screen frame shown on the display screen 134 may appear immediately as the user performs the activity and then later reappear such as a ghost movement once the screen frame update is received. However, as delays are reduced, for example by Giga-bit per second network transfer rates, the initial and subsequent mouse pointer movements converge to one movement as perceived by the user of the remote computer 120. Furthermore, as discussed below, the display of the local mouse cursor may be turned off for a browser window at the remote computer 120 so that only a single mouse cursor is shown at all times, regardless of propagation delays.

In addition to receiving user input, the interaction system 110 may also provide for additional interaction with the remote computer 120 by providing a USB connection to a USB port (not shown) of the local computer. The USB connection allows the interaction system 110 to emulate USB devices for the local computer 102, such as additional storage devices including devices that the local computer 102 may use when booting-up. For example, the remote computer 120 may provide a floppy, CD-ROM, or hard disk drive that contains a boot-up sequence to be used by the local computer 102. Upon a connection being established over the network 118 between the interaction system 110 and remote computer 120, the local computer 102 may boot from a media source of the remote computer 120 with the boot-up sequence provided through the USB port of the local computer.

The USB connection from the interaction system 110 may also allow a local keyboard and mouse and/or a keyboard and mouse of the remote computer to be emulated for the local computer 102. For example, the local computer 102 may have only USB ports instead of PS/2 ports and the interaction system 110 outputs mouse and keyboard signals to the local computer through the USB connection.

Figure 2:
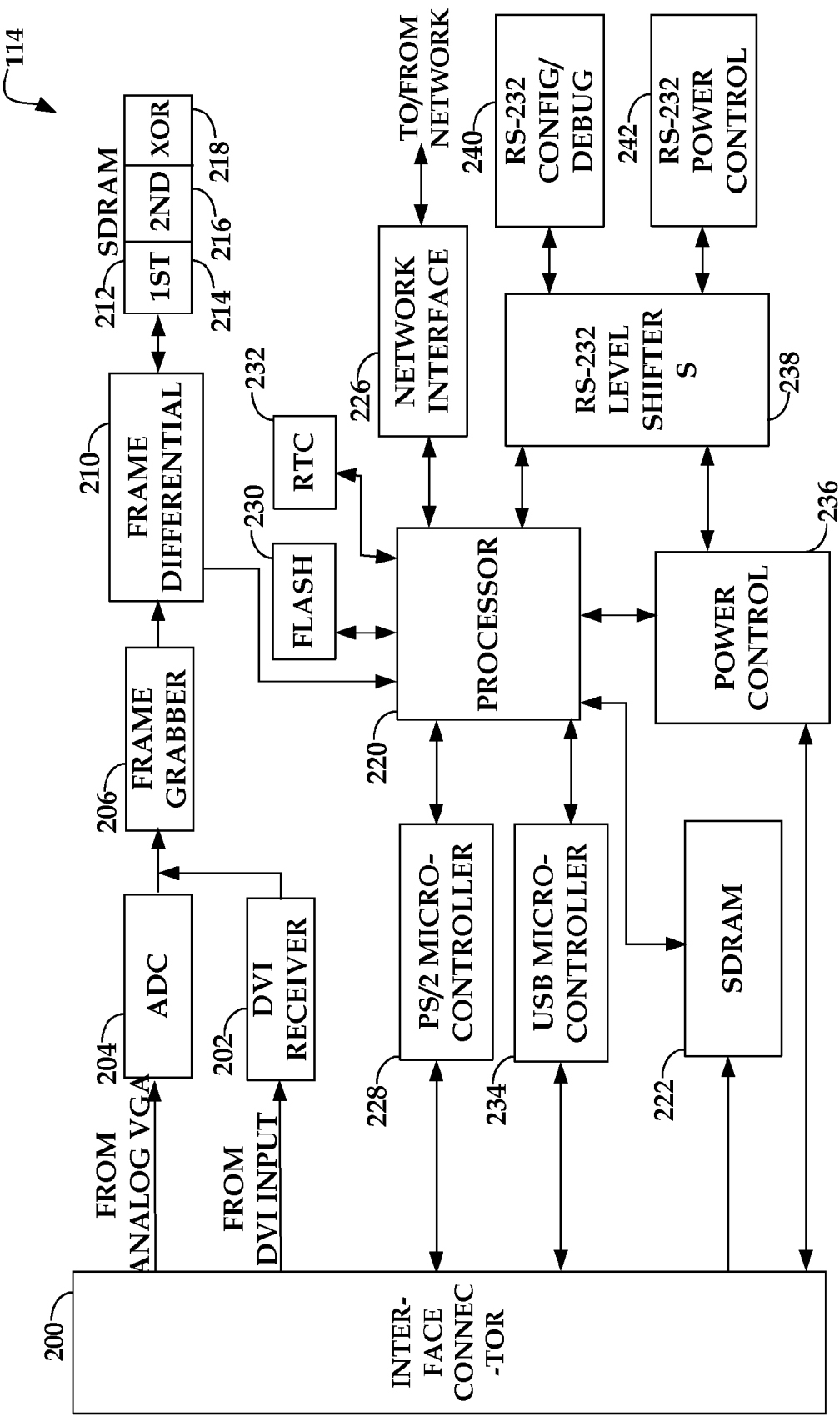
FIG. 2 shows the functional components of a redirection module embodiment according to the present invention.

FIG. 2 shows the major components of one embodiment of the redirection module 114 of FIG. 1. This embodiment of the redirection module 114 includes an interface connector 200. This interface connector 200 may be a printed circuit board goldfingers-type connector configured to mate with internal connector 400 of a KVM switch 112 according to an embodiment of the present invention or with 90-degree connector 504 on the surface of a server-blade 502. Interface connector 200 receives analog or digital video signals from a KVM switch 112, as well as passing and receiving mouse and keyboard commands to and from the KVM switch 112. All communications between a remote computer 120 and a local computer 102 pass through interface connector 200. Redirection module 114 may also include an analog to digital converter 204 if used with local computers 102 that output analog video signals. The analog VGA signal includes five distinct signals, including a red drive, a blue drive, a green drive, a horizontal synchronization pulse, and a vertical synchronization pulse. In an alternate embodiment, a local display screen may be connected to the interaction system 110 for viewing the video signal of a local computer 102. In this situation, a video buffer (not shown) may be used to condition the video signal through amplification and output it to the local display screen so that splitting the video signal between the converter 204 and the display screen does not degrade the signal and the resulting display.

The converter 204 digitizes the video signal including the five distinct signals. The converter 204 then outputs the digitized video signal to a frame grabber 206. As one alternative, a digital video output of the local computer 102, if available, could be provided to the frame grabber 206 in place of the analog video signal that has been digitized as described above. If the local computer 102 provides digital output, digital video signals pass from interface connector 200 to the DVI receiver 202, which then provides the digital video signals to the frame grabber 206. The frame grabber 206 takes the portion of the digitized video signal corresponding to one screen frame and outputs that portion of the digitized signal as discrete screen frame data. The converter 204 and frame grabber 206 may be separate components or may be incorporated as one component. For example, an LCD controller may be used as a frame grabber 206 to capture the screen frame data.

The screen frame data is utilized by a frame differential component 210 to compute a difference between screen frame data of a current screen and a screen frame data of an immediately preceding screen frame. The frame differential component 210 maintains a previous screen frame data in a first memory location 214 in SDRAM 212 and maintains the current screen frame data in a second memory location 216. The frame differential component 210 then executes an exclusive OR ("XOR") Boolean operation upon the two sets of screen frame data to indicate where the changes have occurred between the two. The result of the XOR operation is stored in a third memory location 218.

The frame differential component 210 provides the screen frame data to a processing device 220 so that it may be transmitted. The screen frame data may be either the entire screen frame data of the most current screen frame grabbed from the digitized video signal, or may be the screen frame data making up the difference detected by the XOR operation described above. Providing only the screen frame data representing the difference between the current screen frame and the preceding screen frame results in less data being distributed over the network 118.

Additional filtering functionality of the frame differential component 210 that is applicable when the analog video is digitized to reduce the amount of unnecessary data transfer may also be included, such as applying threshold comparisons to the most current screen frame data to determine whether to send the results of the XOR operation or send no new screen frame data. The threshold of this filtering component may be set as desired. As an example, the filter may look to apply a 7 bit per pixel threshold to determine whether the screen frame data has had a significant change worth transmitting or only contains sampling noise where an analog to digital converter is used. When changes in the current screen frame data are significant as determined by the threshold, then the result of the XOR may be transmitted. The frame differential component 210 may be implemented in various ways, including a programmable logic device such as a field programmable gate array ("FPGA") 302 or application specific integrated circuit that is configured to implement the XOR operations and provide the result to the processing device 220.

The processing device 220 interacts with the frame differential component 210 to access the screen frame data to be provided to a network interface device 226. The processing device 220 may be implemented in various ways discussed above, such as but not limited to the PowerPC® 405GPr general purpose reduced instruction set processor manufactured by IBM® Corp. The processing device 220 employs logic to package the screen frame data for transfer by the network device 226 via a particular protocol, such as TCP/IP. The screen frame data to be transferred may be compressed through anyone of various compression schemes to further reduce the amount of data to be transferred. The compression scheme may be programmed into either the frame differential component 210 or the processing device 220. Alternatively, the screen frame data may be transferred without being compressed, but additional network bandwidth will be utilized due to larger data transfers.

The screen frame data may be packaged for distribution by the processing device 220 from a network node established by the processing device 220 through the network interface 226. As one alternative, the processing device 220 in association with the network interface 226 may implement logic to behave as a web server having a particular IP address for the network 118. This web server service provides the screen frame data as a resource that can be requested by a remote computer 120 through the network 118 by accessing the IP address of the web server service via a dedicated or generic browser window, such as a web browser like Internet Explorer by Microsoft®.

The screen frame data may be utilized by the browser window of the remote computer 120 in various ways. As an example, the browser window may be used to download the screen frame data in a continuous streaming manner and the screen frame data may be incorporated for display on the screen 134 by a dedicated application program of the remote computer 120. As another example, the browser window of the remote computer 120 may download the screen frame data in a continuous streaming manner for display of the screen frames on the screen 134 within the browser window itself such as where the browser window is a web browser. The browser window may implement browser commands of plug-in logic dedicated for a particular operating system platform such as an Active X® control to display the screen frames, or alternatively may implement a virtual machine that runs system independent browser commands such as a JAVA™ applet.

The processing device 220 interacts with SDRAM 222 to perform the processing operations including receiving the screen frame data and packaging the data for transfer by the network interface 226. Generally, the processing device 220 or network interface includes a media access control ("MAC"). The MAC obtains carrier access within a network to transmit the packets of the screen frame data and/or browser commands for physical layer transfer by the network interface 226. The network interface 226 may be of various forms such as a dial-up, digital subscriber line, ISDN, or cable modem or an Ethernet transceiver directly linked to a data network. The data is transferred from the transceiver of the network interface 226 via the network 118 to the appropriate IP address of the network interface 124 of the remote computer 120.

In addition to transferring the screen data to the remote computer 120 via the network 118, the network interface 226 also receives data transferred from the remote computer 120 over the network 118. The network interface 226 receives the request for screen frame data that occurs once the remote computer's browser has been directed to the IF address of the web server service associated with the redirection module 114. An example of a network interface 226 is a "phy" such as model LXT972A manufactured by Intel® Corp.

Additionally, the network interface 226 may receive data from the remote computer 120 that is indicative of the user activity occurring on the user interface devices of the remote computer 120. As discussed above, the end user may interact with the local computer screen frame being displayed on the screen 134 of the remote computer 120 by using the mouse and keyboard when the focus of the remote computer 120 is within the browser window display. The browser commands receive the user input of the user interface device and generate data corresponding to the user input relative to the local computer screen frame. The data is transmitted to the redirection module 114.

The redirection module 114 receives the data indicating the user activity through the network interface 226 where it is unpackaged from its transmitted state back to data that can be interpreted by the processing device 220. The processing device 220 receives the data describing the user activity that took place through the user interface devices of the remote computer 102. The processing device 220 then outputs a user interface command to a microcontroller 228. In alternate embodiments, a local keyboard and local mouse (not shown) may be connected to the interaction system 110 or a local computer 102. In these embodiments, the microcontroller 228 arbitrates between the user input received over the network and the local user input received through a bus connection to an 80C42 compatible keyboard/mouse controller (not shown) that is coupled to the local mouse and keyboard. The microcontroller 228 may arbitrate by giving priority to one of the inputs where both the local and remote user input is received simultaneously to produce a clock and data output that is sent to the mouse or keyboard port of the local computer 102. In many instances, it may be appropriate to give the user input received over the network connection priority over local user inputs.

The local computer 102 implements the user activities transferred to the interaction device 110 over the network 118 as if they occurred through user interface devices directly coupled to the interface system 110 or local computer 102. The user interface data provided as signals from the microcontroller 228 to the mouse port 104 or keyboard port 106 of the local computer 102 appear as ordinary mouse and keyboard data and clock signals. Flash interface 230 may store an operating system as well as provide a flash file system. A recovery switch (not shown) allows a user to recover from a firmware upgrade where the upgrade process failed or was interrupted. Normally, a firmware upgrade is done over the network 118 through the network connector. If the connection is lost during an upgrade, the firmware image may be corrupted. The recovery switch may be held in at power-up, allowing the redirection module 114 to enter a protected boot block of code in flash 230 that is never overwritten during a firmware upgrade.

RS-232 port 240 provides an interface for connecting the redirection module 114 to a serial port of the local computer 102. A cable (not shown) may be provided with the redirection module 114 that has a connector for port 240 on one end and a standard DB-9 connector for a serial port on local computer 102. Port 240 may be used for debugging, diagnostics, and firmware upgrades. Additionally, a user may connect the redirection module 114 to a serial port of the local computer 102 using port 240 and associated cable, and use a terminal program to configure network settings, such as DCHP or static IP address, netmasks, and gateways. Port 240 communicates with processor 220 through RS-232 level shifters 238.

RS-232 port 242 may also be connected to a number of readily available power switches, which can be used to control power on and off to one or multiple servers. Using port 242, a remote user may cycle power on anyone local computer of the set of local computers 102A-102N by issuing a command through the network 118, which is transmitted through network interface 226, to processor 220, to level shifters 238, to the port 240, and subsequently to the power switch (not shown). Real time clock ("RTC") 232 provides for timekeeping functions, allowing for storage of times associated with certain events, such as keeping a log detailing when each user logs in and out.

To establish the USB connectivity discussed above between the interaction system 110 and the local computer 102, a USB microcontroller 234 may be included. The USB microcontroller 234 communicates with the processing device 220 to emulate a USB node for the local computer 102. Thus, a media source of the remote computer may be accessible by the local computer 102 by the USB microcontroller 234 emulating a USB media device for the local computer 102. Also, as discussed above, the USB microcontroller 234 may allow the emulation of a keyboard and mouse for the USB input of the local computer 102 to pass local and/or remote keyboard and mouse signals to the local computer 102.

Figure 3A:
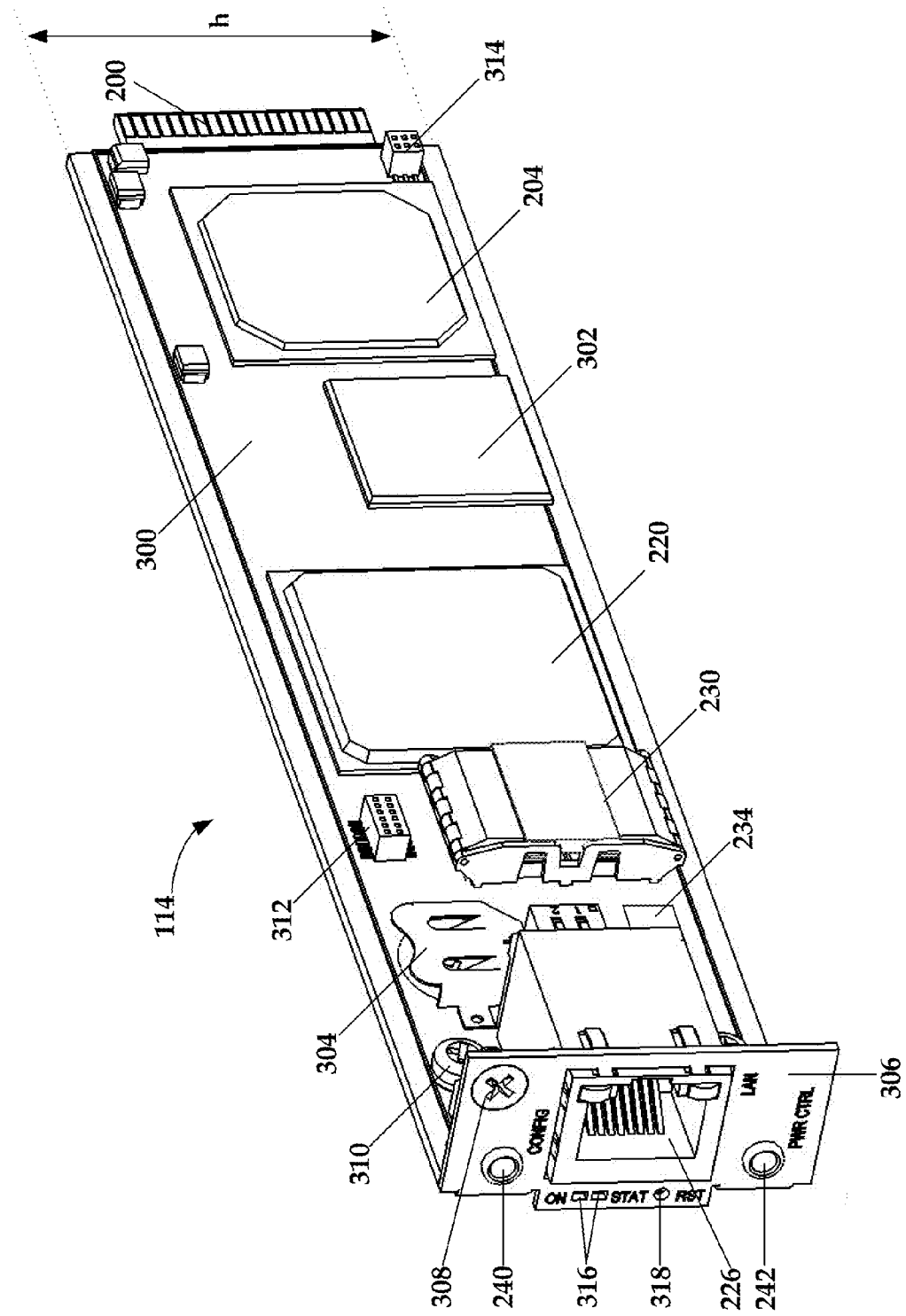
FIG. 3A is a perspective view of a redirection module embodiment according to the present invention that is configured to be used with the KVM switch embodiment of the present invention depicted by FIGS. 4A and 4B, and with the server-blade embodiment of the present invention depicted by FIGS. 5A and 5B, to facilitate the remote management of a set of local computers.
Figure 3B:
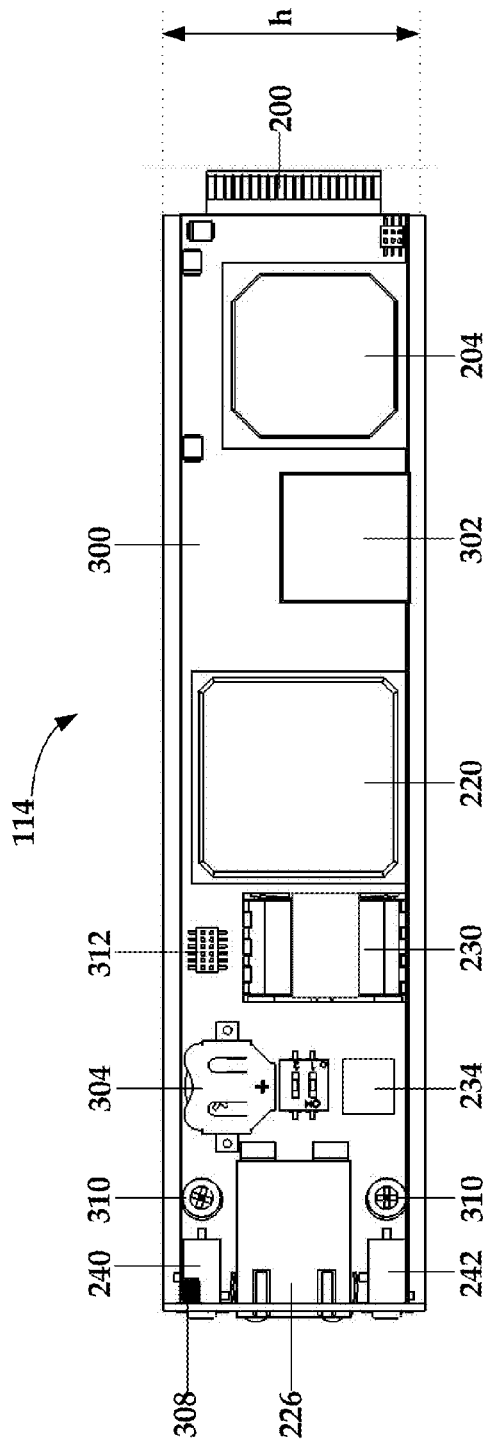
FIG. 3B is a side elevational view of the device embodiment of FIG. 3A.

FIGS. 3A and 3B show a perspective view and side elevational view, respectively, of a redirection module 114 according to aspects of the present invention. Redirection module 114 consists of printed circuit board ("PCB") 300. PCB 300 contains and electrically connects the hardware necessary for managing and controlling a local computer 102 from a remote computer 120. The module 114 is configured for use with a KVM switch 112 that connects to a plurality of local computers 102A-102N. The KVM switch 112 allows for the remote monitoring and management of multiple computers 102A-102N one at a time, using a single redirection module 114, or simultaneous monitoring and management of one or more computer 102A-102N using multiple redirection modules 114. The KVM switch 112 is described in detail below with reference to FIGS. 4A and 4B.

Interface connector 200 provides the interface between redirection module 114 and KVM switch 112 or server-blade 502. Interface connector 200 is preferably a PCB goldfingers-type connector. It is to be understood by one skilled in the art that any other type of connector now known or developed in the future that is suitable for communicatively connecting the components of redirection module 114 to the components of switch 112 or server-blade 502 may be used. Redirection module 114 further comprises analog-to-digital-converter 204, field programmable gate array 302, processor 220, flash interface 230, USB microcontroller 234, network interface 226, and RS-232 ports 240 and 242 as described above. As stated above, the converter 204 may incorporate an LCD controller to be used as a frame grabber 206 to capture the screen frame data. FPGA 302 provides the functionality of the frame differential component 210 described above.

Figure 5A:
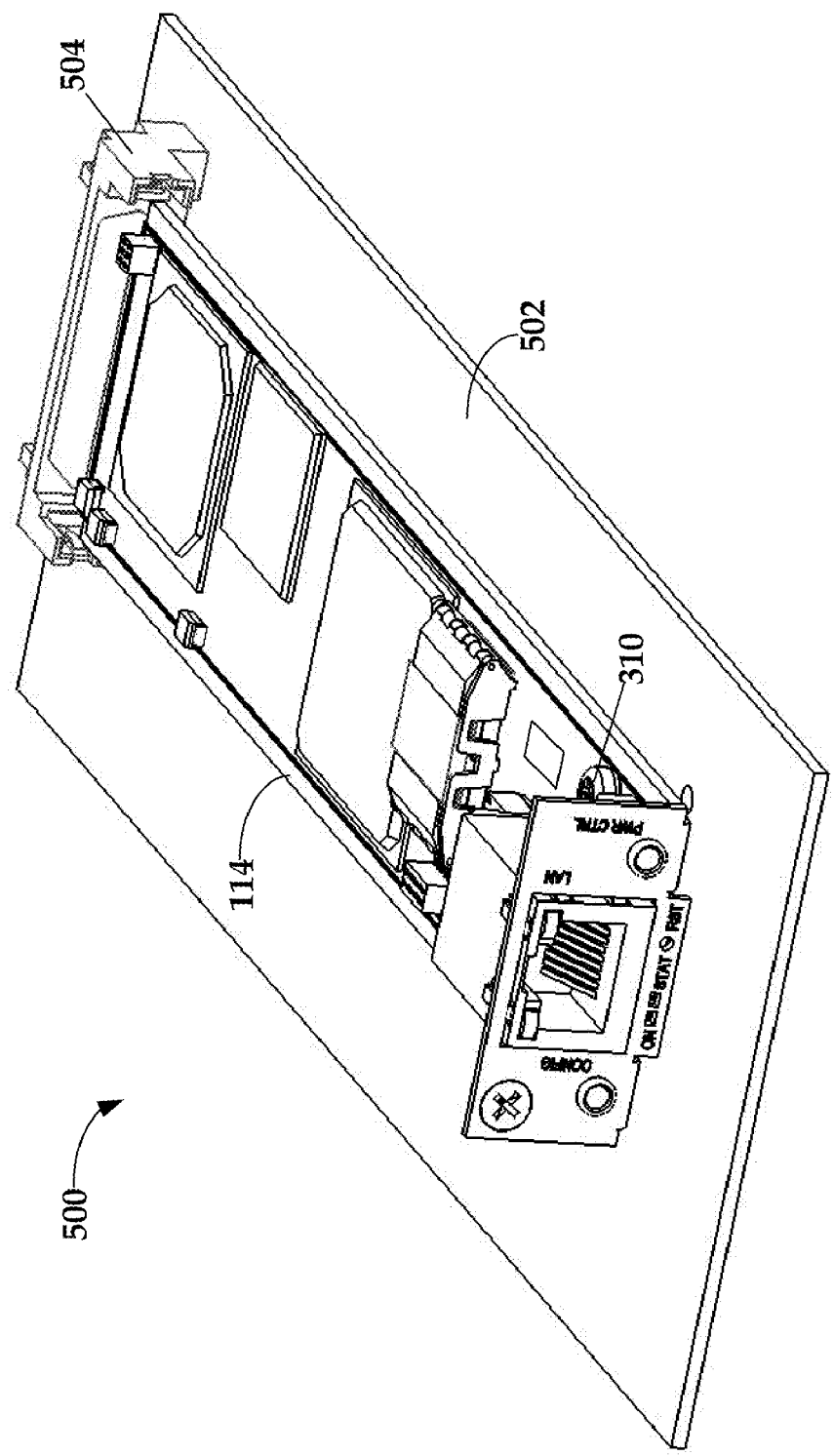
FIG. 5A is a perspective view of a system embodiment according to the present invention comprising a server-blade configured for use with an installed redirection module of FIGS. 3A and 3B for remotely managing a set of local computers.
Figure 5B:
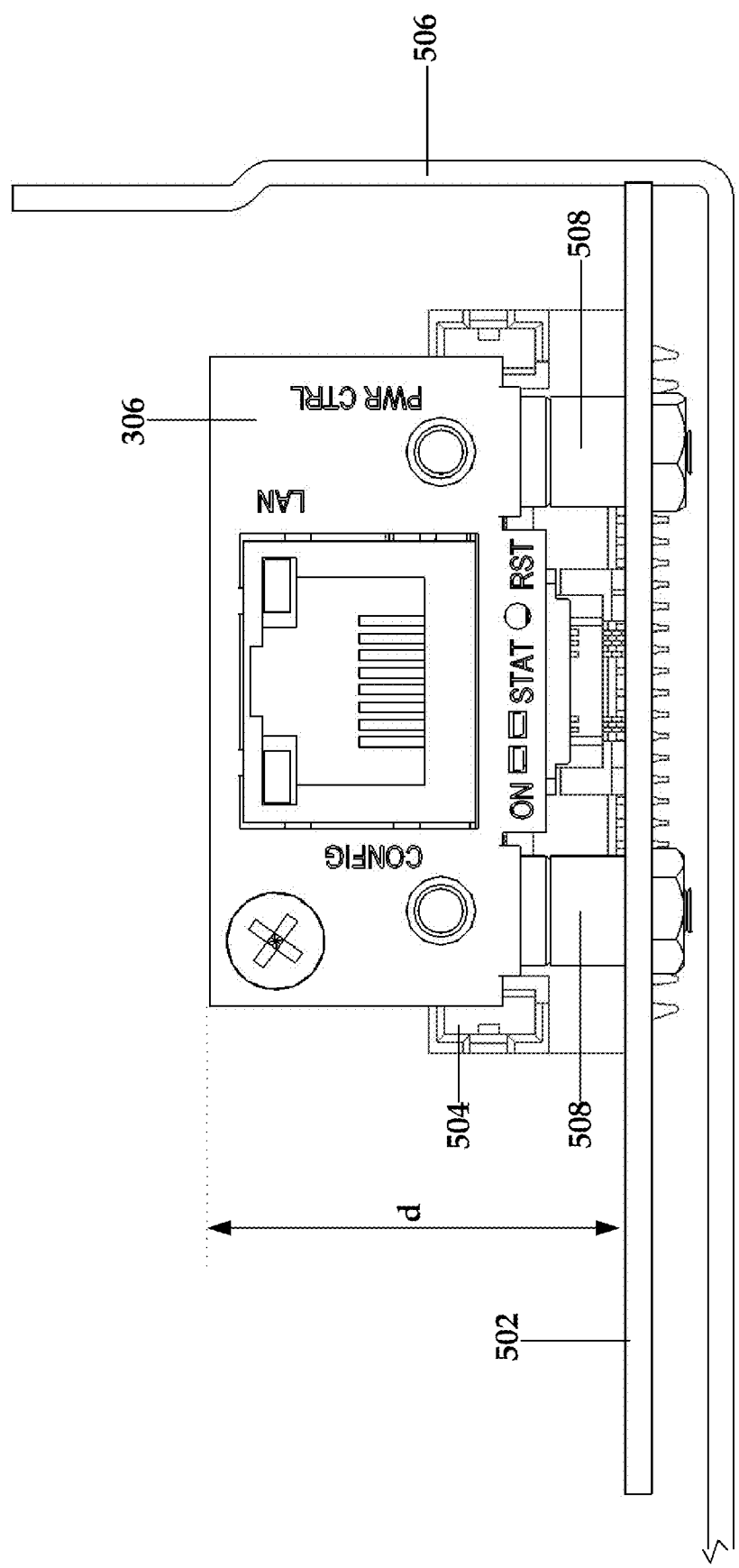
FIG. 5B is a front elevational view of the system of FIG. 5A, illustrating an installed redirection module of FIGS. 3A and 3B.

Redirection module 114 also contains RTC battery 304 for providing battery power to the RTC 232, and also connectors 312 and 314. Connector 312 may be used to connect an in-circuit emulator to the processor 220 and for programming flash interface 230. Similarly, connector 314 may be used for programming firmware for the PS/2 microcontroller 228. Module 114 is configured to easily install vertically into KVM switch 112 or horizontally onto server-blade 502. As seen in FIGS. 3A and 3B, the distance between opposing sides of module 114 is represented by height h. The maximum height h should allow the module 114 to install vertically in a 1 U, or 1.75 inch, height KVM switch 112. Preferably, the height h of module 114 should be equal to or less than 1.625 inches. For installation on a server-blade, as shown in FIGS. 5A and 5B and discussed below, module 114 has connectors 310. Fasteners 310 extend through PCB 300 to secure module 114 in a horizontal position on server-blade 502. As will be appreciated by those skilled in the art, fasteners 310 may be screws or any other type of re-usable fastener suitable for securing and unsecuring module 114 to and from server-blade 502. Various power sources may be included for the module 114. On-board batteries and/or a wall adapter may be utilized to provide the DC voltage required by the circuitry described above. Preferably, the module 114 may draw power from its connection to the KVM switch 112, through the interface connector 200.

Figure 3C:
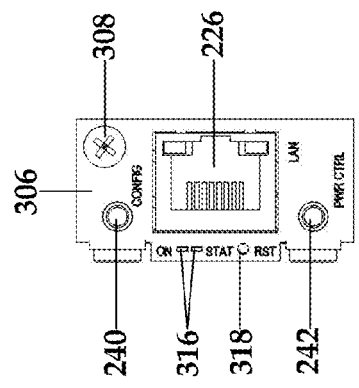
FIG. 3C is a front elevational view of the device embodiment of FIG. 3A.

As seen in FIGS. 3A and 3C, module 114 has a front surface 306, which is disposed on the end of module 114 opposite of the interface connector 200. Front surface 306 provides a mounting surface for securing module 114 to a KVM switch 112. Fastener 308 protrudes through front surface 306 and secures front surface 306 to a vertical surface of switch 112. It is to be appreciated that fastener 308 may be a screw, clip, or any other type of re-usable fastener suitable for securing and unsecuring module 114 to and from switch 112. Front surface 306 provides apertures through which network interface 226, and RS-232 ports 240 and 242 protrude. In this manner, network connections may be made to these components while redirection module is installed in KVM switch 112.

Additionally, LEDs 316 are provided on front surface 306 as indications that the module 114 is powered and operational. It is to be understood that any type, color, or number of LEDs may be used to provide any type of status indication, including other types of visual or audible status indicators to provide a user with component status indications while module 114 is installed in switch 112. FIGS. 3A and 3C also show reset button 318, which is a recessed micro-tactile switch that can be depressed in the event of a catastrophic error to reset module 114 without the necessity of cycling the power. Although reset button 318 is recessed to prevent accidental depression, it may also be a raised button or a toggle switch.

Figure 4A:
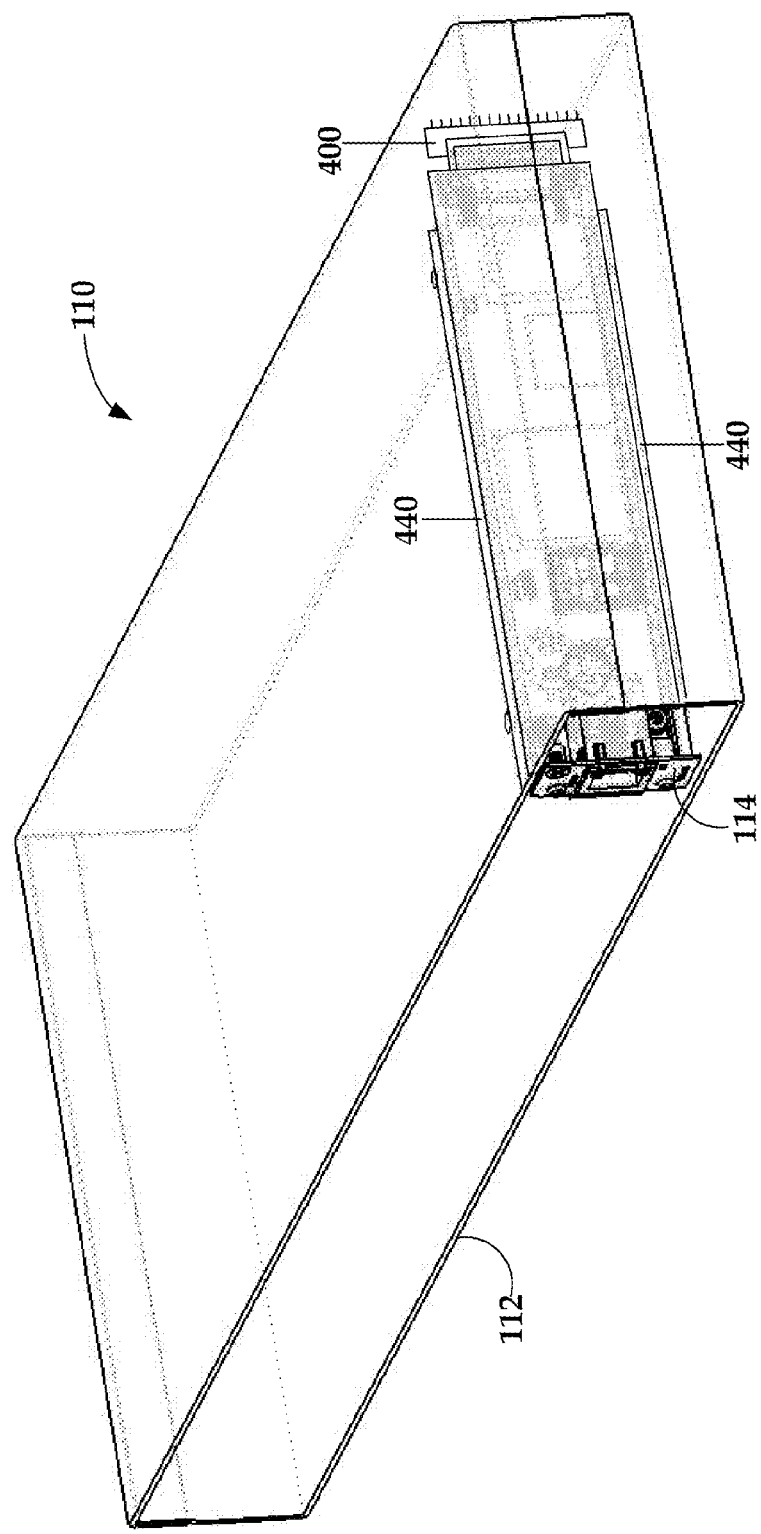
FIG. 4A is a perspective view of a system embodiment according to the present invention comprising a KVM switch configured for use with an installed redirection module of FIG. 3 for remotely managing a set of local computers.
Figure 4B:
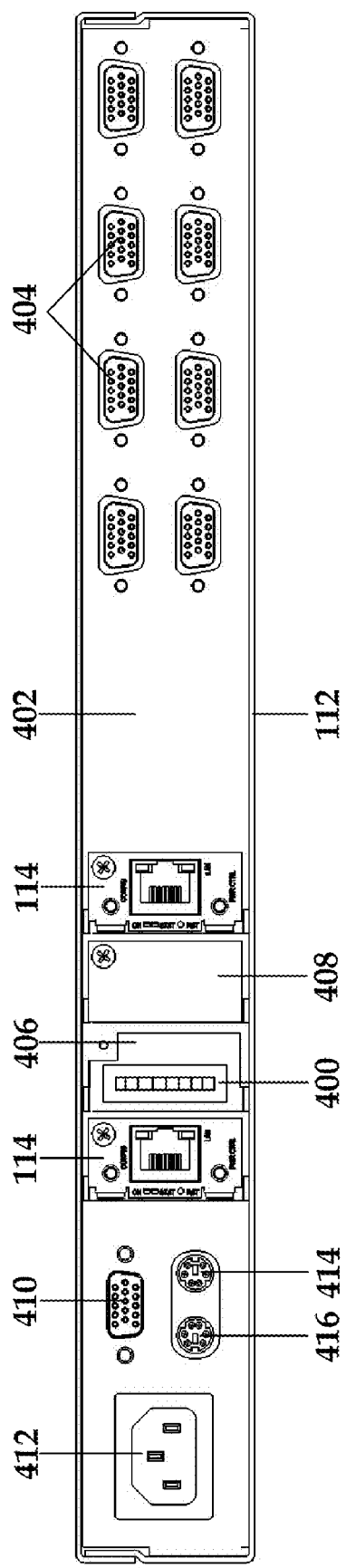
FIG. 4B is a rear elevational view of the system of FIG. 4A, illustrating installed redirection modules of FIGS. 3A and 3B, as well as holes for receiving additional redirection modules and connectors for connecting the system embodiment to a set of local computers.

FIG. 4A shows a perspective view of interaction system 110. FIG. 4B shows a rear view of KVM switch 112. Interaction system 110 comprises KVM switch 112 and redirection module 114. A typical KVM switch is used to enable a user to monitor and control a set of local computers 102A-102N, one at a time, using a single keyboard, mouse, and monitor connected to the KVM switch. Each local computer of the set of local computers 102A-102N is connected to the KVM switch through a connector 404. A local display monitor 140 may be connected to switch 112 using VGA connector 410. A local mouse and keyboard may be connected to switch 112 using PS/2 connectors 416 and 414, respectively. Alternatively, USB connectors may be used in place of PS/2 connectors 416 and 414 and a DVI connector may replace video connector 410. Power port 412 is supplied for connection to a power source. It is desirable for a user to be able to monitor and interact with the local computers 102A-102N from a remote location, rather than having to be at the KVM switch. To do so, redirection module 114 is required.

FIG. 4B shows a KVM switch 112 with multiple redirection modules 114 installed. It is to be understood that switch 112 may be configured for a single redirection module 114 or multiple modules. Only a single module 114 is required for a single user to be able to remotely control a single computer 102 of a set of local computers 102A-102N. Switch 112 allows the remote user to switch between local computers 102A-102N for monitoring and interaction. This switching functionality will be described below in reference to FIG. 4C. If it is desired that multiple users at multiple remote computers be able to remotely monitor and interact with computers 102A-102N simultaneously, then multiple modules 114 are required. For each module 114 installed, a separate user may monitor and interact with the same local computer 102 or different local computers at the same time.

As seen in FIG. 4B, KVM switch 112 contains at least one opening 406 for receiving a redirection module 114. It is to be understood that the switch 112 may contain one opening 406 per module 114 that the switch is configured to receive, or the switch may contain a single opening through which all modules are installed. A blank 408 may be installed in any opening 406 that does not contain an installed redirection module. Redirection module 114 and KVM switch 112 are designed with hot-swapping capability. That is, the module 114 may be installed into and uninstalled from KVM switch 112 while the switch is powered on and operating.

Switch 112 includes internal connector 400 connected to a PCB. Internal connector 400 must be capable of transferring communications between a PCB of switch 112 and goldfingers interface connector 200. Preferably, vertical connector 15-92-1440 from MOLEX, INC. is used. Internal connector 400 is mounted within switch 112 opposite opening 406. Interface connector 200 of module 114 is fully seated within connector 400 when the module is slid through opening 406 of switch 112 and into the switch until the front surface 306 of the module is flush against surface 402 of the KVM switch. To facilitate installation of redirection module 114 into KVM switch 112, slide rails 440 may be used or slots within the KVM switch housing for guiding the edges of redirection module 114. Fastener 308 may be used to secure the front surface 306 of the module 114 to surface 402 of the switch 112. As discussed above, one skilled in the art will appreciate that other securing means may be used.

Figure 4C:
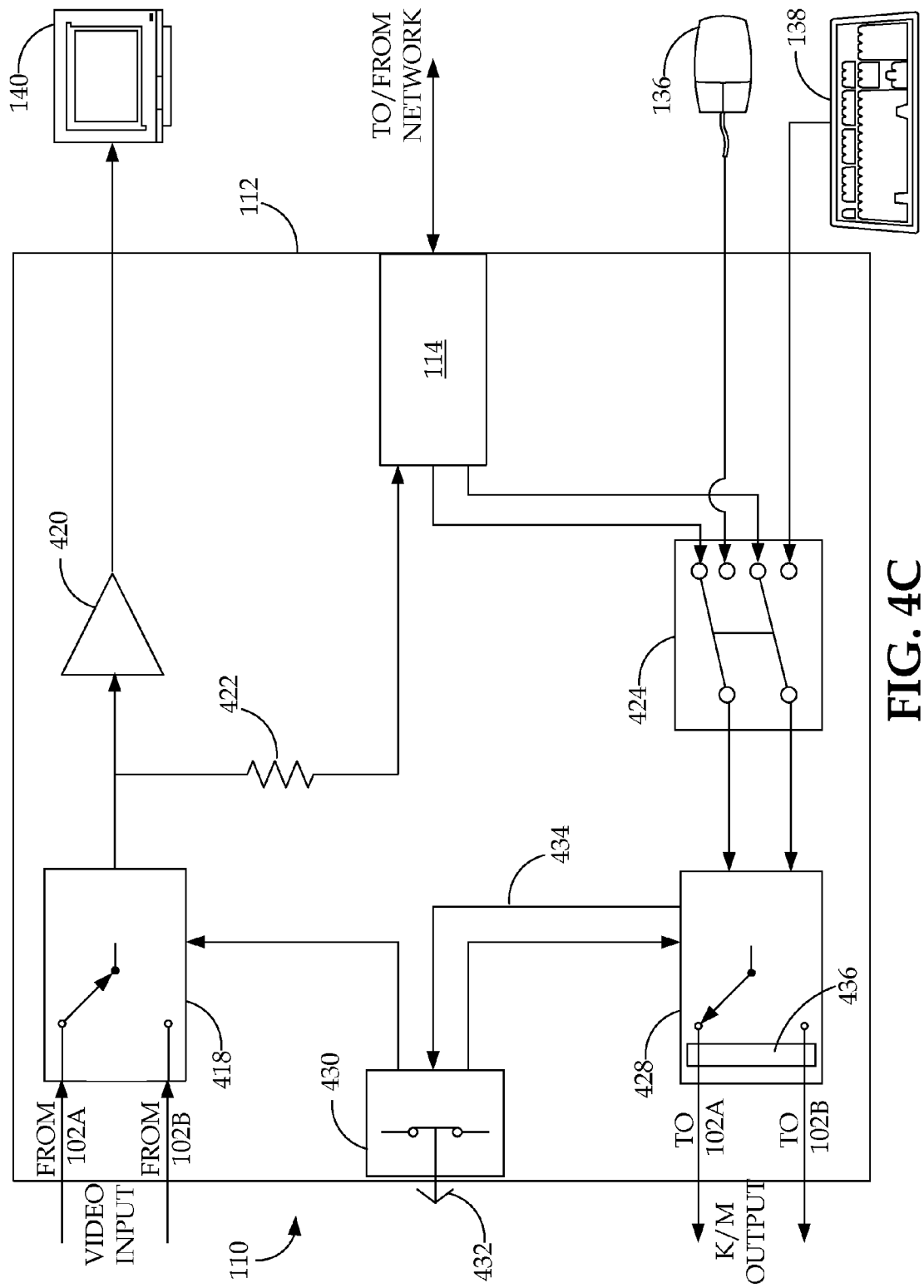
FIG. 4C shows the functional components of the system of FIG. 4A.

FIG. 4C shows the functional components of the interaction system 110 and illustrates the capabilities of system 110 to monitor and interact with each local computer 102A-102N, one at a time, using remote input from mouse 130 and keyboard 132, as well as local input from mouse 136 and keyboard 138. FIG. 4C has been simplified for the purposes of illustration. According to FIG. 4C, interaction system 110 provides monitoring and interaction capabilities for only two local computers, 102A and 102B; however, it is to be understood that any number of local computers 102A-102N may be connected to interaction system 110, subject only to the number of connectors 404 that switch 112 may physically accommodate.

Video signals from local computer 102A enter interaction system 110 and enter the video switch matrix 418. If a user has selected local computer 102A for monitoring, the signals will pass through the video switch matrix 418 to the amplifier buffer 420. The signals then pass to a local display screen 140. Local display screen 140 is connected to the KVM switch 112 through video connector 410. The video signal is also passed through resistor 422 to redirection module 114 where it is processed to transfer captured screen frame data through a network to a remote computer as described above. When mouse and keyboard data is input from the remote computer and passed through the network to the redirection module 114, the data is transferred to a mouse and keyboard switch 424.

At switch 424, arbitration occurs between mouse and keyboard input from the remote computer and conflicting mouse and keyboard input from local mouse 136 and keyboard 138. For example, when mouse and keyboard input is entering interaction system 110 from both the remote computer and local mouse and keyboard at the same time, it may be desirable for the local mouse and keyboard input to control. With this rule programmed into switch 424, or when switch 424 is otherwise instructed by processor 220 or other component, the switch 424 will only allow local mouse and keyboard commands to pass to the switch matrix 428 when in direct conflict with input from the mouse and keyboard attached to the remote computer. If a user has selected local computer 102A for monitoring, the signals will pass through the keyboard/mouse switch matrix 428 to local computer 102A. Microcontroller 436 returns a mouse response for local computer 102B when queried by the local computer when the local computer is powered on. By doing so, local computer 102B will believe that a mouse is connected to the computer and will recognize and accept the remote mouse input when the keyboard/mouse switch matrix 428 switches from local computer 102A to local computer 102B.

When a user chooses to monitor and interact with a different local computer from the computer currently being monitored, the change may occur in one of two ways. First, if interacting with the local computer 102A from a local computer directly connected to interaction system 110, the user may press button 432. Button 432 activates a switch within port selector 430, which causes the video switch matrix 418 and keyboard/mouse switch matrix 428 to activate internal switches that will deselect computer 102A and select 102B in a manner well known to those well skilled in the art. It is to be understood that while port selector 430, video switch matrix 418, and keyboard/mouse switch matrix 428 are depicted in FIG. 4C as three separate components, they may be a single component or multiple components.

If a user is interacting with the local computer 102A from a remote location over a network and wishes to select local computer 102B for monitoring and interaction, the user may make the selection using a mouse, a button, a typed command, or by executing a predetermined key combination. Interaction system 110 may be programmed to recognize the command from the remote computer as a selection of a different local computer for monitoring. The command will be passed through the keyboard/mouse switch matrix 428 to port selector 430 via pathway 434. The command will electrically activate port selector 430 just as if button 432 had been physically pressed.

FIGS. 5A and 5B depict an alternate embodiment of the present invention, interaction system 500. With interaction system 500, a redirection module 114 is used with a server-blade 502 to allow a user to remotely monitor and manage the server-blade. Video and control inputs are passed to and from server-blade 502 and a remote computer 120 using redirection module 114, just as redirection module 114 and KVM switch 112 may be used to pass video and control inputs to and from a set of local computers and a remote computer as described above. Redirection module 114 is mounted in a horizontal configuration as seen in FIG. 5A using a mating connector 504.

Mating connector 504 is preferably right-angle connector 87620-0001 from MOLEX, INC., but may be any connector suitable for transferring communications between server-blade 502 and goldfingers interface connector 200. When mounted in a horizontal configuration, as seen in FIGS. 5A and 5B, redirection module 114 may be secured to the server-blade 502 using fasteners 310. While FIG. 3B shows two fasteners 310, any number and type of fasteners may be used. Additionally, spacers 508 may be used between server-blade 502 and module 114 to secure the module in a horizontal position with a desired distance between the module and the server-blade, depending on the height of the mating connector 504. This can be seen in FIG. 5B, which shows a front elevational view of the redirection module 114 mounted on a server-blade 502, which is mounted in a rack 506.

The dimensions of module 114 preferably remain the same as described above with respect to FIGS. 3A and 3B. Because of the minimal size of redirection module 114 and the horizontal mounting configuration, the distance d as measured from the top of the server-blade to the top of front surface 306 is minimized. Preferably, distance d is less than one inch. This mounting configuration is advantageous since it allows a number of server-blades 502 to be rack-mounted very close together, while providing the remote management capabilities of the redirection module 114. By mounting the module 114 in a position spaced above server-blade 502, the board space below the module is still available for circuitry and other components. In other words, module 114 takes up very little space on server-blade 502. As with the KVM switch 112, the redirection module 114 and server-blade 502 are configured such that the module may be hot-swapped without removing power from the server-blade. In another embodiment, redirection module 114 may be installed on a master server-blade that has switching capabilities and is connected to a set of server-blades. The master blade acts in a capacity similar to the KVM switch 112 described above.

Figure 6:
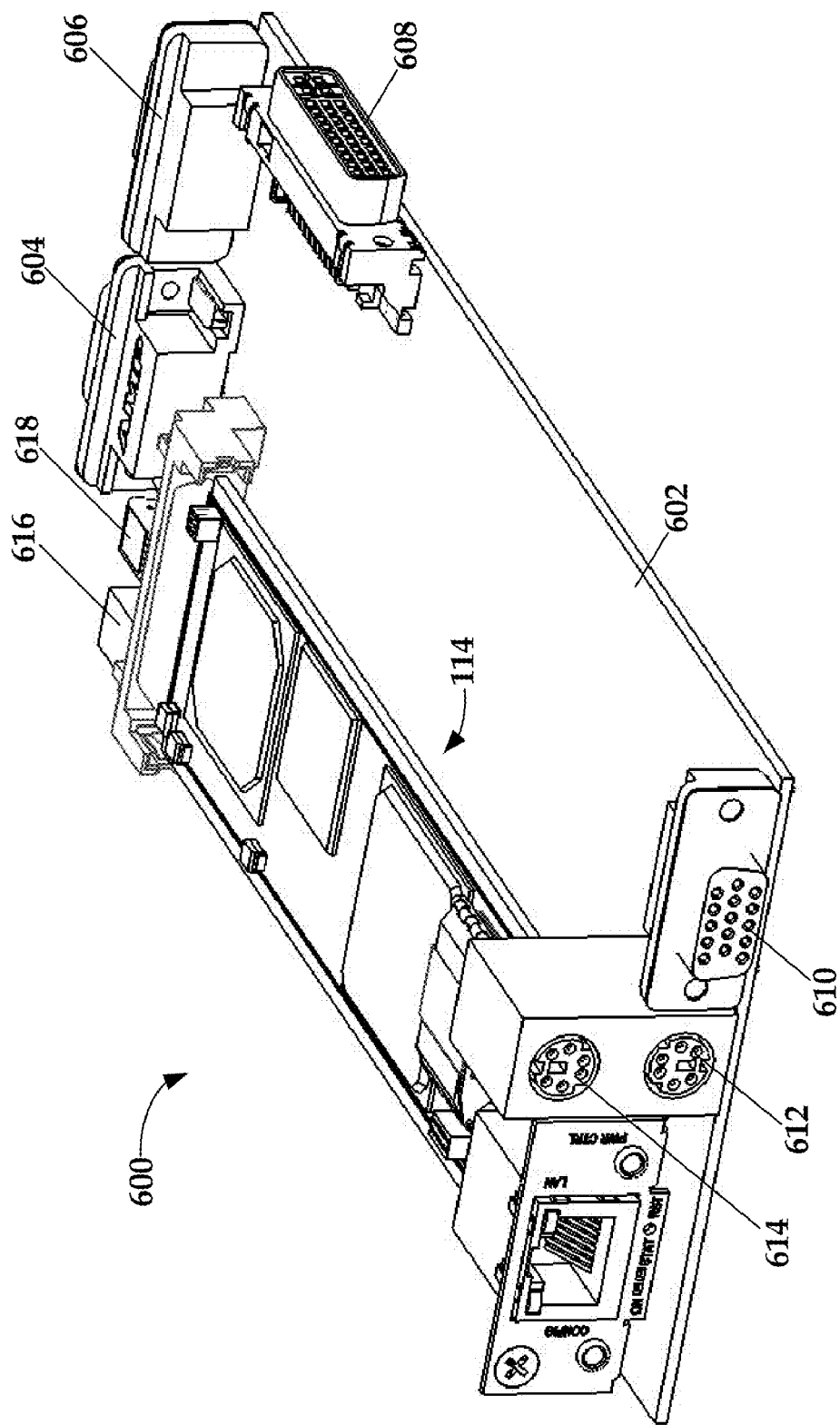
FIG. 6 is a perspective view of a system embodiment according to the present invention comprising a redirection module of FIGS. 3A and 3B installed on a development board for testing the redirection module.

FIG. 6 illustrates a further embodiment of the present invention. Interaction system 600 includes a redirection module 114 coupled with a development board 602. Development board 602 includes video connector 610 and PS/2 ports 612 and 614 for connection to local display, keyboard, and mouse. Board 602 also includes DVI video input 608 and VGA input 604 for connecting the board to local computers. RS-232 serial port 606 is used for debugging and development. Power may be supplied to interaction system 600 through power supply jack 616. Port 618 provides a mini-USB type connector for connection to a host PCB. Interaction system 600 may be shipped to customers for testing of redirection module 114 as well as for development of firmware for the module. It provides a quick, simple method of testing redirection module 114 with current systems.

A method of controlling a plurality of local computers 102A-102N from a remote computer 120 when a user connects a set of local computers 102A-102N to the KVM switch 112. The connections are made using cables from each computer 102 to a input connector 404 of the switch 112. The user then installs a KVM redirection module 114 into switch 112 by removing blank 408, sliding the module through opening 406 until the front surface 306 of the module is flush against surface 402 of the switch, and securing the module to the switch using fastener 308. The user plugs one end of a network cable into network interface 226, and the other end to a network 118. After these steps are completed, remote monitoring and interaction is possible. It is to be understood that these steps can be performed in any order and are not limited to the order discussed here.

The user then selects a local computer for monitoring at select step 708 by issuing commands to the KVM switch 112 from the remote computer 120. If more than one module 114 is installed in switch 112, the user may monitor more than one computer 102 simultaneously. The user receives and views video signals from the selected local computer 102 at the display screen 134 of the remote computer 120. The user can use a mouse 130 and keyboard 132 at the remote computer 120 to provide input to and interact with local computer 102. This input is transmitted over the network 118 to the local computer 102.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A keyboard, video, mouse (KVM) redirection module for establishing interaction between a plurality of local computers and a remote computer, comprising:
    a printed circuit board;
    an interface connector disposed at a first edge of the printed circuit board configured to interface with a KVM switch mating connector on a KVM switch and to receive video signals from a local computer of the plurality of local computers through the KVM switch mating connector;
    a frame grabber on the printed circuit board that grabs screen frames from the video signals to create screen frame data;
    a network interface device on the printed circuit board having a network connector disposed at a second edge of the printed circuit board opposite the first edge, such that the network connector is externally accessible when the interface connector is connected to the KVM switch mating connector on the KVM switch; and
    the printed circuit board having at least one processing device configured to provide the screen frame data to the network interface device for distribution across a network.

2. The KVM redirection module of claim 1, wherein the module can be installed in the KVM switch while the switch is fully assembled and connected to the plurality of local computers.

3. The KVM redirection module of claim 1, wherein the module can be installed in the KVM switch and begin operation without removing power from the switch.

4. The KVM redirection module of claim 1, further comprising an RS-232 port that is externally accessible when the interface connector is connected to the KVM switch mating connector on the KVM switch for connection to a local computer for configuration of the module.

5. The KVM redirection module of claim 4, further comprising an RS-232 port that is externally accessible when the interface connector is connected to the KVM switch mating connector on the KVM switch for connection to a power control device to control power on and off to a local computer.

6. The KVM redirection module of claim 1, further comprising a USB controller, wherein the processing device controls the USB controller to emulate a storage device of the remote computer for use by each of the plurality of local computers.

7. The KVM redirection module of claim 1, further comprising an analog-to-digital converter that digitizes analog video signals to produce digitized video signals.

8. The KVM redirection module of claim 1, wherein the module is configured for installation in a KVM switch such that the module comprises a front surface adjacent to the second edge of the printed circuit board, wherein the surface is substantially perpendicular to the circuit board and has connecting means for securing the front surface to a housing surface of the KVM switch.

9. The KVM redirection module of claim 1, wherein the printed circuit board further comprises opposing third and fourth edges that span between the first and second edges of the circuit board and wherein the distance between the opposing third and fourth edges is equal to or less than 1.625 inches.

10. A keyboard, video, mouse (KVM) redirection module for establishing interaction between a plurality of local computers and a remote computer, comprising:
    a printed circuit board;
    an interface connector disposed at a first edge of the printed circuit board configured to interface with a server-blade mating connector on a server-blade and to receive video signal data from a local computer of the plurality of local computers through the server-blade mating connector;
    a frame grabber on the printed circuit board that grabs screen frames from the video signals to create screen frame data;
    a network interface device on the printed circuit board having a network connector disposed at a second edge of the printed circuit board opposite the first edge, such that the network connector is externally accessible when the interface connector is connected to the server-blade mating connector on the server-blade; and
    the printed circuit board having at least one processing device configured to provide the screen frame data to the network interface device for distribution across a network.

11. The KVM redirection module of claim 10, wherein the module can be installed on the server-blade and begin operation without removing power from the server-blade.

12. The KVM redirection module of claim 10, further comprising an RS-232 port that is externally accessible when the interface connector is connected to the server-blade mating connector on the server-blade for connection to a local computer for configuration of the module.

13. The KVM redirection module of claim 12, further comprising an RS-232 port that is externally accessible when the interface connector is connected to the server-blade mating connector on the server-blade for connection to a power control device to control power on and off to a local computer.

14. The KVM redirection module of claim 10, further comprising a USB controller, wherein the processing device controls the USB controller to emulate a storage device of the remote computer for use by each of the plurality of local computers.

15. The KVM redirection module of claim 10, further comprising an analog-to-digital converter that digitizes analog video signals to produce digitized video signals.

16. The KVM redirection module of claim 10, wherein the module is configured for installation on a server-blade in a horizontal position such that the printed circuit board is parallel to the server-blade and the height of the installed module as measured from a surface of the server-blade is less than one inch.

17. The KVM redirection module of claim 10, wherein the printed circuit board further comprises opposing third and fourth edges that span between the first and second edges of the circuit board and wherein the distance between the opposing third and fourth edges is equal to or less than 1.625 inches.

18. The KVM redirection module of claim 10, wherein the video signals received through the interface connector are digital video signals.

* * * * *